WIRING MACHINE FOR MAGNETIC CORE BOARDS

Filed June 7, 1965 7 Sheets-Sheet 1

INVENTORS W. LOGAN
E.E. NEWHALL

BY [signature]
ATTORNEY

WIRING MACHINE FOR MAGNETIC CORE BOARDS

Filed June 7, 1965

7 Sheets-Sheet 7

United States Patent Office 3,351,102
Patented Nov. 7, 1967

3,351,102

WIRING MACHINE FOR MAGNETIC CORE BOARDS

Walter Logan, Somerset, and Edmunde E. Newhall, Brookside, N.J., assignors to Bell Telephone Laboratories, Incorporated, New York, N.Y., a corporation of New York Filed June 7, 1965, Ser. No. 461,896
13 Claims. (Cl. 140—93)

ABSTRACT OF THE DISCLOSURE

A core board to be wired is placed in a frame positionable in an X–Y plane pursuant to a predetermined positioning program. Needle handling heads on opposite sides of the plane are mounted in a fixed linear path for movement toward and away from the plane. Each head grasps the needle with an inner and an outer jaw. The outer jaw moves away from the inner jaw to position the needle initially and the inner jaw rotates after the strand has been drawn and released by the outer jaw and the head has begun an advance back to the X–Y plane.

This invention relates to wiring machines and particularly to a machine for automatic wiring of ferrite core boards.

The recent greatly expanded usage of ferrite and other core type memory units has stimulated work toward more efficient core board manufacturing techniques. Typically a core board comprises a planar array of washer-shaped ferrite elements flush-mounted into a configuration of holes through a thin rigid nonconducting sheet. The wiring of each board involves threading a given continuous conductor back and forth through successive ones of the ferrite elements. Usually a number of conductors are thus applied to each board to interconnect the cores in a particular desired pattern.

This interlacing motion of a single conductor between opposite surfaces of a core array gives rise to certain problems unencountered in the closely related sewing machine art and largely unsolved by current core wiring devices. It is imperative, for example, to avoid sharply bending or creasing the conductor or damaging the delicate insulation in the threading process. Many prior art devices rely on capturing a wire loop fed through a core and thereafter in effect dragging away the loop and the wire until the wire's end clears the core. This method is found to weaken and otherwise damage the wire and also is inherently slow because of the tendency of the loose wire end to fishtail at higher threading speeds.

Another problem in mass producing wire core boards involves the limitations placed by prior art threading techniques upon the lateral positioning of the board subsequent to each core threading. Certain specific patterns of interlace may require that the wire be fed from a first core to a second remotely located core instead of to the more usual adjacent core. Known threading devices are not readily suitable to the variant patterns mentioned.

A further current problem is that the conductor to be threaded must be kept relatively short, again due largely to current threading techniques, which entails having to furnish new conductors to the device too frequently.

Accordingly, an object of the invention is to reduce the time and cost of wiring core type memory boards.

Another object of the invention is to machine-wire ferrite core boards using longer lengths of wire, without straining or damaging the wire.

A further object of the invention is the automatic threading of a wire in a preselected pattern through a succession of cores in a ferrite board alternately from one side of the board to the other.

These and other objects are achieved in accordance with the principles of the invention by a wiring machine employing a board holder positionable in an X–Y plane and two sets of identical wiring heads mounted in linear relation on opposed tracks perpendicular to said plane, each set consisting of an outer head with fixed jaws and an inner head with rotatable jaws. One of the inner heads, holding therein a needle and wire advances to a core board that has been prepositioned by the board holder, directs the needle through a selected core and stops. The needle emerges on the opposite side of the core and enters within the jaws of the other headset, the outer head seizing the needle adjacent its point. Directly thereafter the inner head holding the needle releases it. The outer head retreats first, withdrawing the needle. When the end of the needle reaches the still stationary inner head, the latter also seizes it and retreats with the outer head. The adjacent heads withdraw until the wire is fully threaded through the selected core. To return the needle and wire to the board, both heads carrying the needle stop and the outer head releases it. Both heads return toward the board, and the inner head pivots 180 degrees, producing a smooth loop in the wire. The second set advances to the board and feeds the wire through a different core brought into the needle's path of advance by a repositioning of the board holder pursuant to a preselected scheme.

In accordance with one aspect of the invention, each outer head is movable with respect to its adjacent inner head; and all heads have independently operated jaws. For example, on receiving the needle, the jaws of the outer head involved close and the head retreats with the needle. The adjacent inner head, however, remains stationary as the needle passes through a notch or groove in its open jaws. When the needle end arrives approximately at the notch, the inner head grasps the needle and simultaneously is brought into the retreat motion. Both heads continue to the far end of the track or until the wire is taut, whereupon the outer jaws release the needle. Both heads begin to return toward the core board and concurrently the inner head begins to rotate. After feeding the needle through a new core, the inner head stops but the adjacent outer head continues until it returns to its original position immediately adjacent the now stationary inner head. The point at which the needle is grasped by the jaws of the inner head may be varied to produce loops of different radii where desired. In this process, no sharp bends and no creases are imparted to the wire or its insulation.

In accordance with another aspect of the invention the wire may be guided by a needle directly into each core or, if desired, may be used as its own needle. In either case, no loops are formed for the purpose of doubling up the wire to force or draw it through a core and, advantageously, snarling and damaging of the wire are completely avoided.

A feature of the invention, therefore, resides in a wiring machine having two sets of heads aligned in linear relation on opposite sides of a positionable core board holder, each head having movable, individually actuated jaws.

Another feature of the invention involves the timed movements of the heads of each set to redirect the wire toward a new core in the board while producing a non-snarling gentle loop in the wire.

A further feature of the invention relates to the planar prepositioning of a core board in the path of a threading device that passes a needle and wire back and forth through selected cores.

A still further feature of the invention involves means for producing all of the described motions in a timed, coordinated sequence.

These and other objects and features of the invention are more particularly pointed out in the detailed description to follow of an illustrative embodiment thereof and in the drawing in which.

Figure 1:
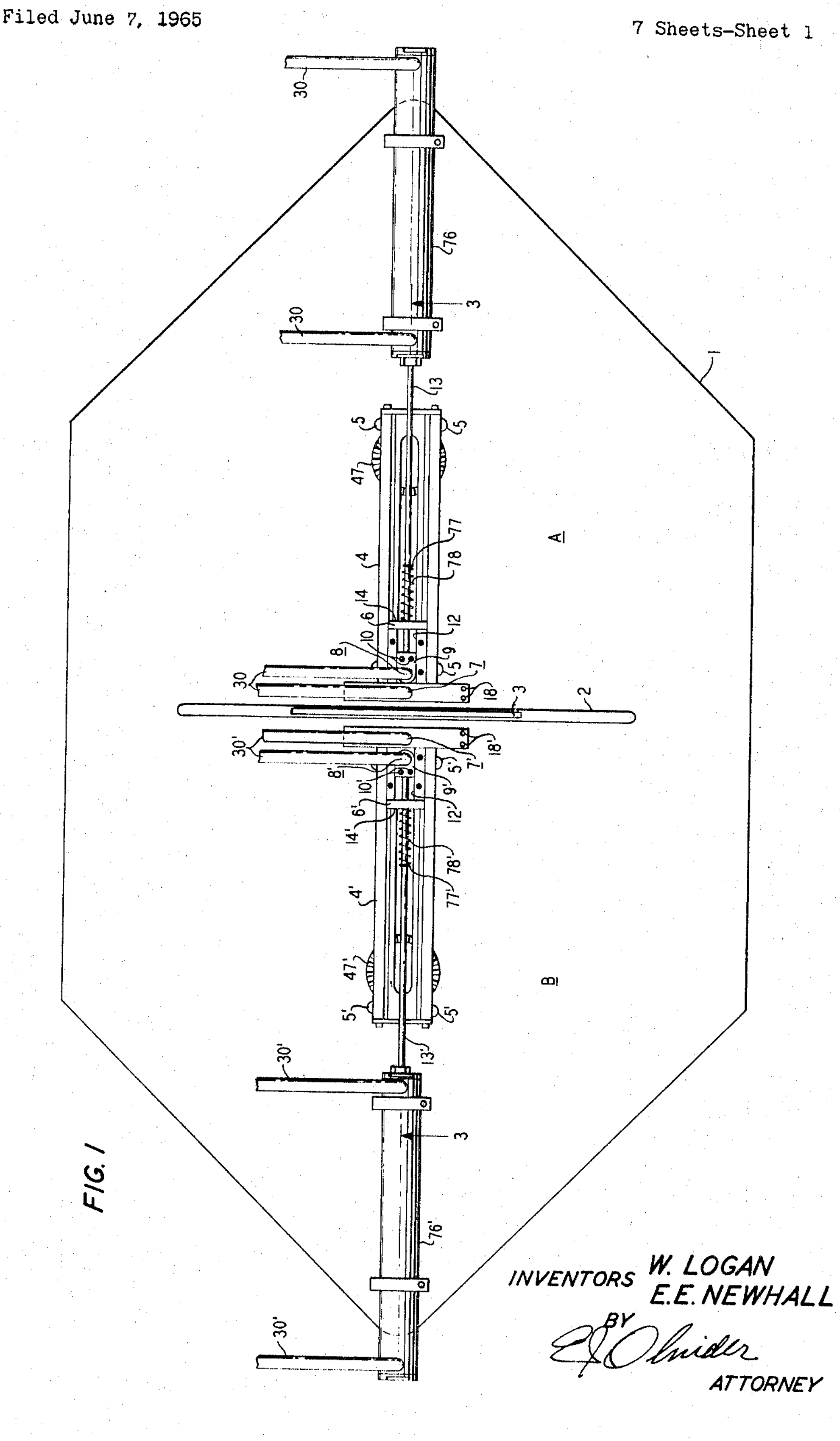
FIG. 1 is a plan view of a device embodying the invention.
Figure 2:
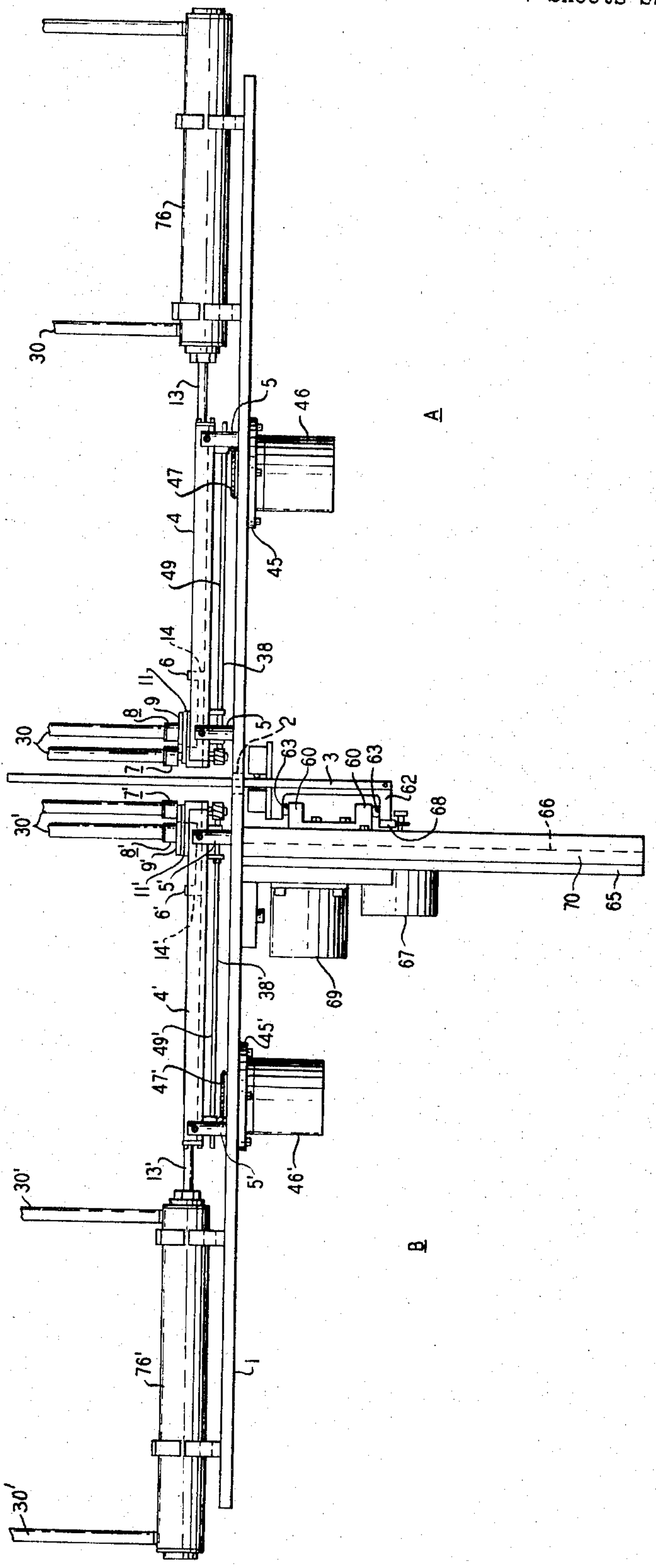
FIG. 2 is an elevation view.

FIG. 1 shows the basic elements of a wiring machine embodying the inventive principles, shown for convenience as attached to a mounting plate 1 in which an elongated slot 2 permits movement of a core board holder 3 in a plane perpendicular to plate 1, passing through slot 2. For illustrative purposes, each of the mechanisms shown on side A of slot 2 has an identical structural counterpart on side B of slot 2. For brevity, the detailed description will be limited to one side, but it should be understood that the description applies also to equivalent structures on the opposite side, which are designated by primed corresponding numbers.

Figures 3, 4:
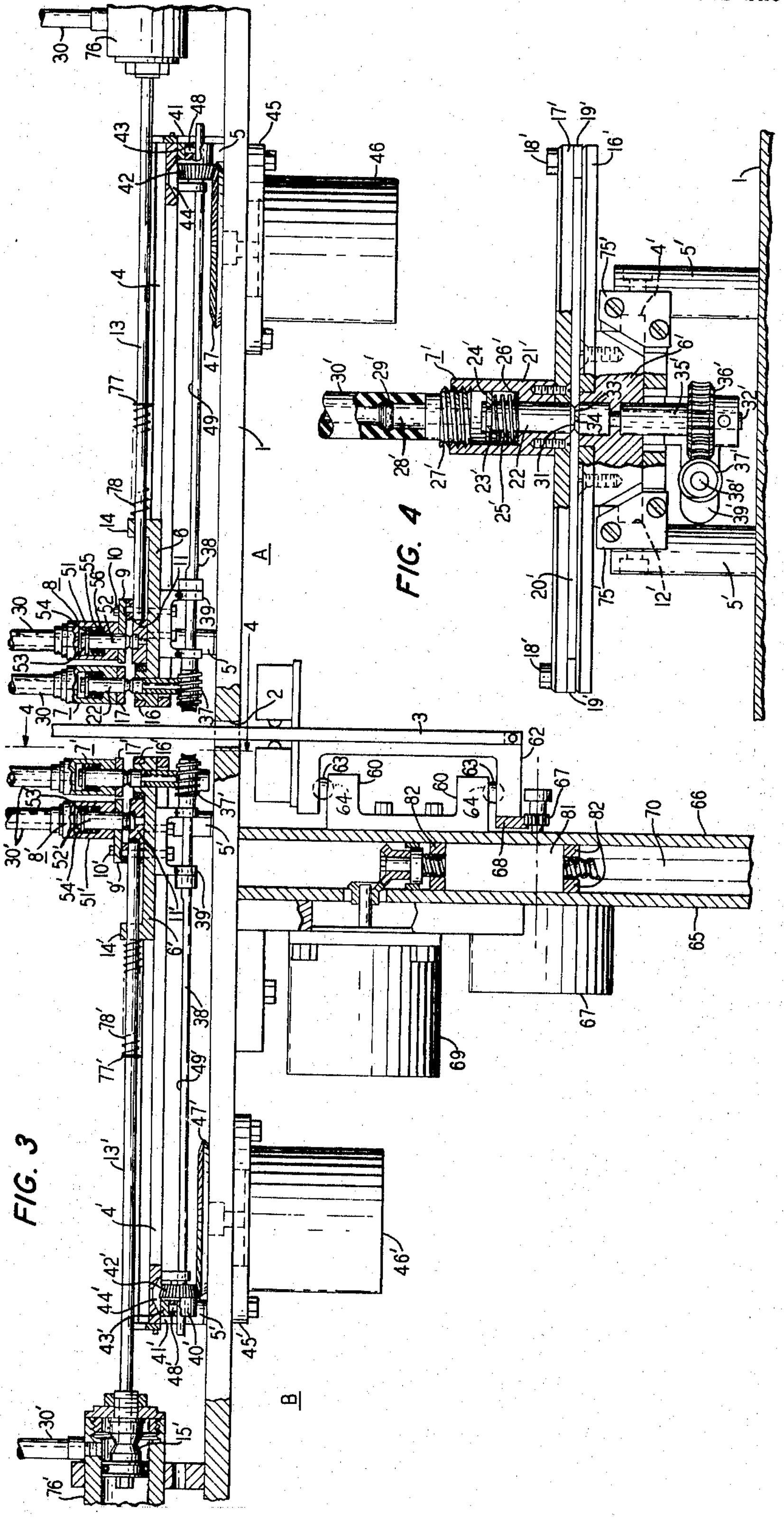
FIG. 3 is an elevation view in partial section.
FIG. 4 is a detailed partially sectional elevation view of an inner head.

On side A, a channel 4 is held by a plurality of mounting posts 5 onto plate 1 in perpendicular relation to slot 2. As shown in FIG. 3, a front slide 6 guidably mounted in channel 4 supports a headset comprising inner head 7 and outer head 8. Outer head 8 is mounted on a plate 9 which in turn is fastened with bolts 10 to rear slide 11. Rear slide 11 is guidably mounted on front slide 6 in a guide slot 12 therein for motion toward and away from inner head 7. A rod 13 passes through a passage in flange 14 of slide 6, attaching at one end to slide 11 and at its other end to a suitable retracting means such as pneumatic piston 15.

In FIG. 4, a lower yoke 16 bolted to front slide 6 and an upper yoke 17 are fastened together at their end portions in spaced-apart relation by screws 18 and spacers 19. The space between yokes 16 and 17 defines a narrow, elongated slit or chamber 20 which accommodates rotation of a needle and supports a loop placed in the wire in a manner to be described. A barrel 21 is mounted on yoke 17 and contains a retractable flat-head plunger 22 that is actuated for purposes of illustration by air. Plunger 22 has a flange 23 at one end which holds a retaining ring 24. A release spring 25 seats between ring 24 and a shelf 26 within barrel 21. The neck 27 of barrel 21 is threaded to receive an air inlet 28 having a nipple 29 to which is fastened an air hose 30. The outer end of plunger 22 terminates in a flat contact surface 31.

Beneath surface 31 is a column 32 rotatably held in sleeve 35 which has a flat surface 33 with a notch 34 therein opposing surface 31. A gear 36, fastened to column 32 is engaged by a worm 37, which in turn is mounted at one end of a shaft 38. Supporting shaft 38 for rotational movement at the end adjacent worm 37 is a bracket 39, which is bolted to the underside of front slide 6. Shaft 38 is slidably mounted at its other end in an aperture 40 of a guide bracket 41 that is fastened beneath channel 4. A bevel gear 42 having a hub 43 is held under channel 4 in a clearance hole 44 therein by guide bracket 41 in axial relation to shaft 38. A suitable means, such as a motor 46 mounted on the other side of plate 1 drives a larger bevel gear 47 engaging gear 42, which in turn drives shaft 38 by application of a pin 48 of hub 43 onto a flat portion 49 of shaft 38. In this fashion, notch 34 on column 32 may be rotated within chamber 20.

As best shown in FIG. 3, outer head 8 further comprises a barrel 51 fixedly mounted on plate 9. Barrel 51 and all of its contents, namely, plunger 52 with its flange 53 and ring 54, loaded by spring 55 which rests on shelf 56, neck 57 and air inlet 58 with nipple 59, advantageously, are identical structurally to the respective named counterparts 21 through 29, described in connection with the structure of inner head 7.

A seat 61 is mounted in rear slide 11 directly beneath plunger 52 and includes a notch 64 similar to notch 34. Plunger 52 and seat 61 comprise the jaws of outer head 8, while plunger 22 and column 32, with its notch 34, comprise the jaws of inner head 7. These jaws of the respective heads 7 and 8 receive, transport and rotate a needle to which a wire has been threaded. Beneath plate 1, as shown in FIG. 3, core board holder 3 is guidably mounted for movement within slot 2 in a plane perpendicular to plate 1 and to the direction of movement of heads 7 and 8. Board holder 3 is suitably fastened to a channel 62 that is slidably mounted by suitable means such as bearing 63 on a track 60. Track 60 in turn is mounted in a frame 65 that includes a track 66 which runs vertically with respect to plate 1 and is affixed thereto. A horizontal drive motor 67 engages a rack 68 on channel 62 to effect horizontal movement of board holder 3. A vertical drive motor 69 engages a ball screw 70, attached at each end to frame 65. A ball nut 81 engaging ball screw 70 supports a yoke 82 for vertical movement. Yoke 82 attaches to track 66 so that when drive motor 69 operates, track 60 and channel 62 both move in a vertical direction.

In the following description of the operation, made with reference to FIGS. 3 through 7 and FIGS. 8A through 8H, the mechanisms on side B of mounting plate 1 are referred to by primed numeral designations.

Figure 5:
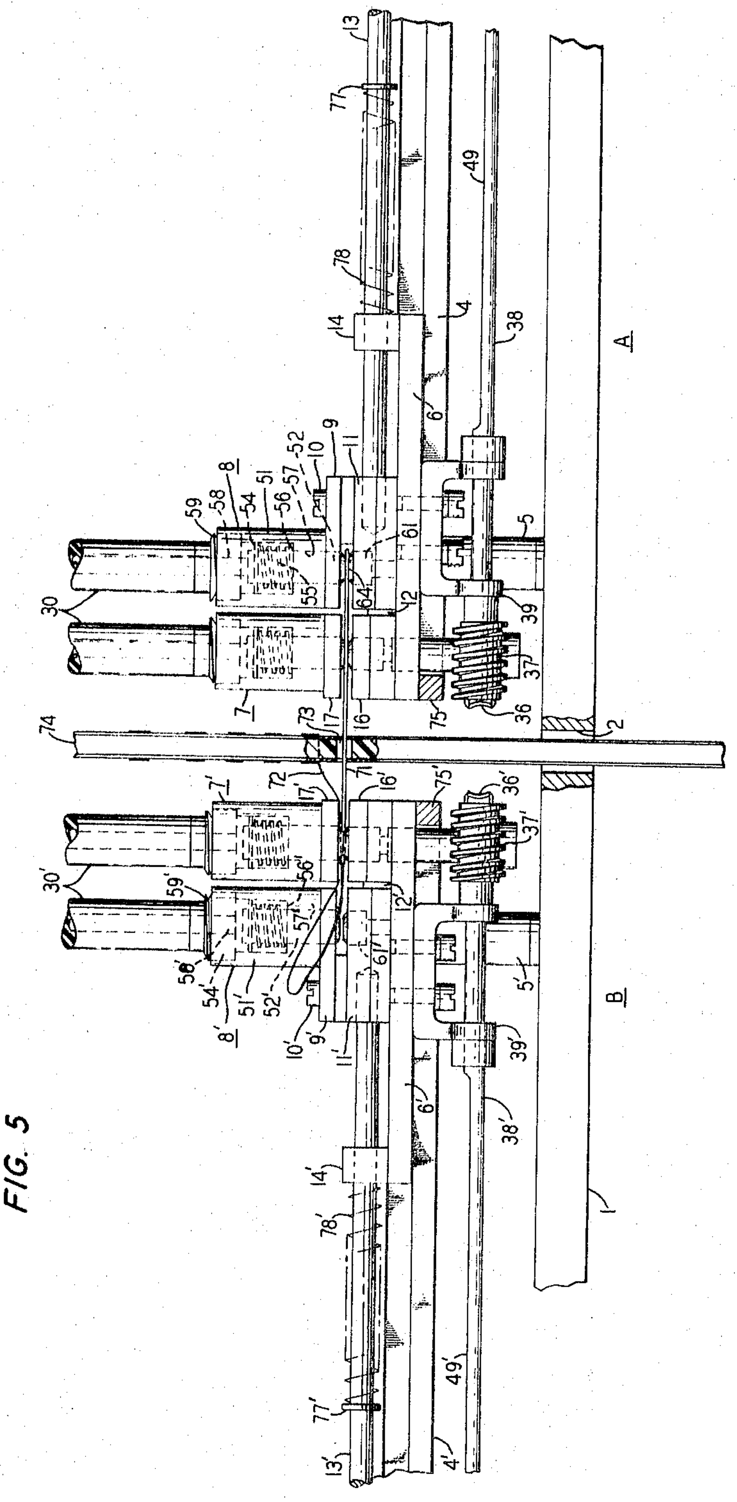
FIG. 5 is a detailed elevation view of both headsets fully advanced.
Figure 6:
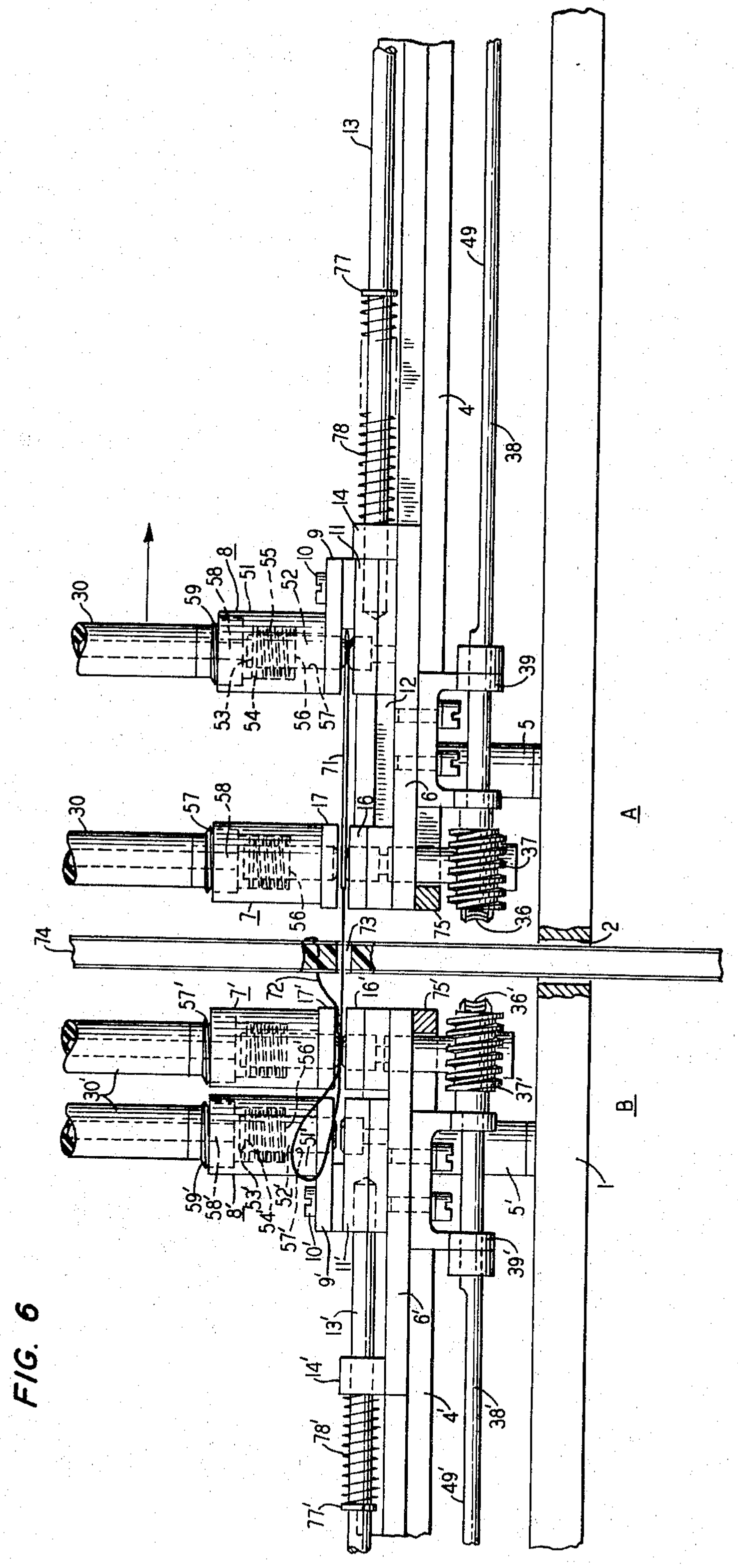
FIG. 6 is similar to FIG. 5, and shows relative retreat movement of adjacent heads.
Figure 7:
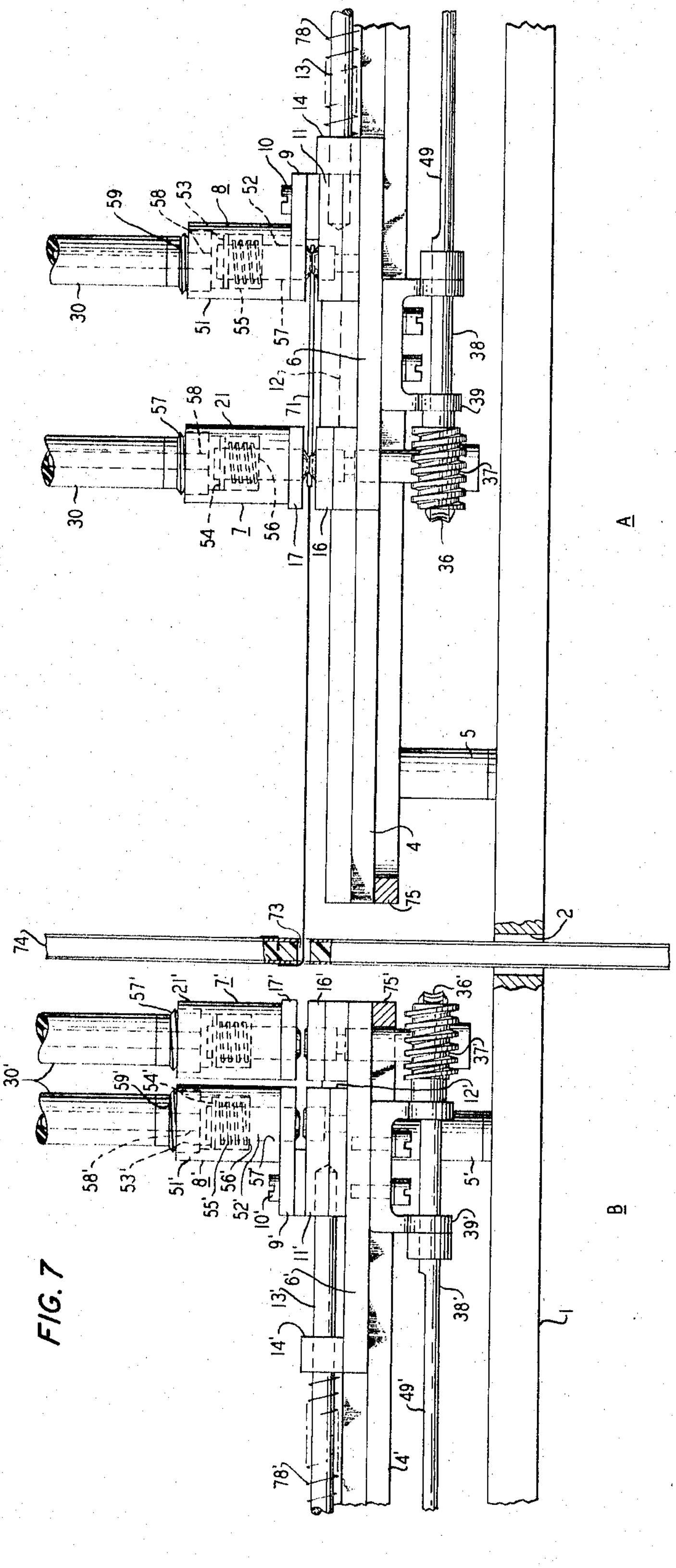
FIG. 7 is similar to FIG. 6, and shows a set of adjacent heads fully retreated.
Figure 8A:
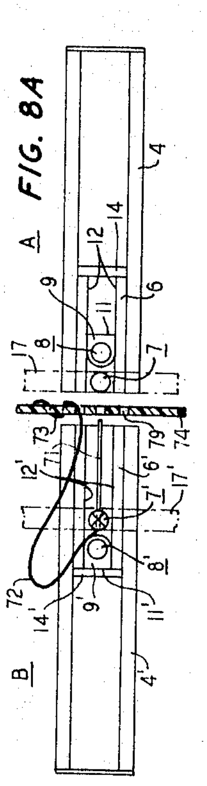
FIGS. 8A through 8H show schematically in top view the sequence of movements.
Figure 8B:
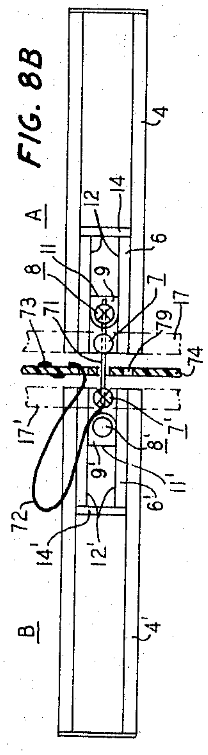
Figure 8C:
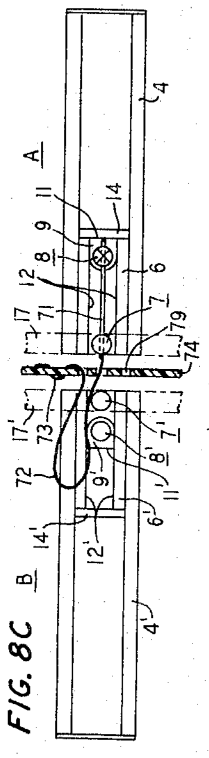
Figure 8D:
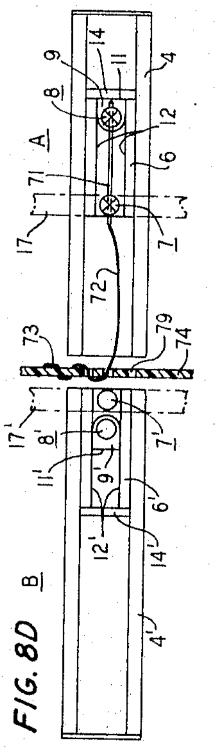
Figure 8E:
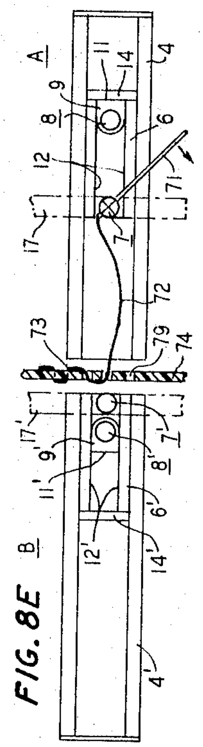
Figure 8F:
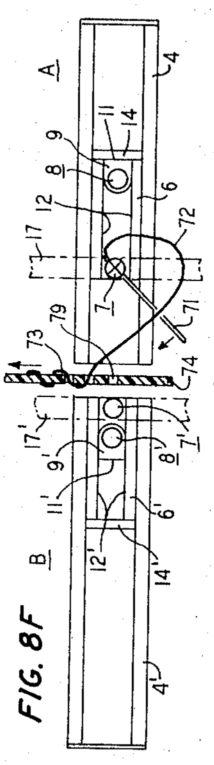

As best seen in FIGS. 3, 4 and 5, a needle 71 held in the jaws of inner head 7' on side B and to which the wire 72 is attached, has been threaded through a particular core 73, one of an array of cores on the board 74 held in holder 3. The other end of wire 72 is shown fixed to board 74 for illustrative purposes. Inner head 7' and outer head 8' have come to rest adjacent board 74 against stops 75, attached to channel 4. Needle 71 has been directed into the open jaws of inner head 7 and outer head 8 on side A. A complete cycle of operation, governed advantageously by a programmed external control (not shown) commences at this point with the application of air through air hose 30 to depress plunger 52 in outer head 8 toward seat 61. Needle 71 is grasped close to its end portion. Directly thereafter, air is applied to one side of piston 15 in air cylinder 76 to withdraw rod 13. Outer head 8, starting from its position shown in FIG. 3 and again in FIG. 8B is slidably pulled by its rear slide 11 along the top of front slide 6. Slide 6 is kept stationary by the compressive force of spring 78 until outer head 8 reaches the position shown in FIG. 6 and again in FIG. 8C. At this point in the withdrawal, the leading edge of rear slide 11 contacts the flange 14 of front slide 6 thereby imparting to it the withdrawing motion. This point is chosen to coincide with the arrival of the needle's eye end adjacent notch 34 of inner head 7. Simultaneously, air is applied through hose 30 to the plunger 22 of inner head 7. The notch 34 in column 32 is parallel to and directly beneath needle 71, having assumed this position in a previous step. Accordingly, needle 71 is impressed by plunger 22 into notch 34 and the two heads 7 and 8 withdraw together at the same rate, drawing wire 72 through the core 73, as shown in FIG. 8D. When wire 72 is drawn taut, or as desired when heads 7 and 8 reach a predetermined position along channel 4, as shown in FIGS. 7 and 8D, air pressure is removed from cylinder 76 and the rod and two heads stop. Pressure is immediately removed from plunger 22 thereby releasing the needle from the jaws of head 8. The needle point is free to pivot in a horizontal plane in either direction away from the jaws of outer head 8.

Figure 8G:
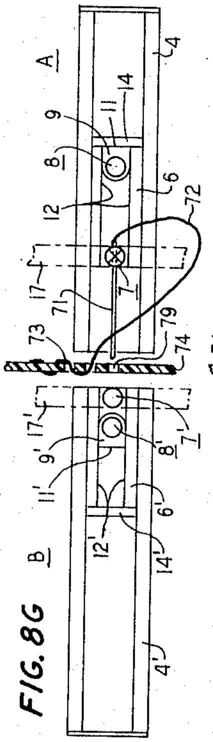
Figure 8H:
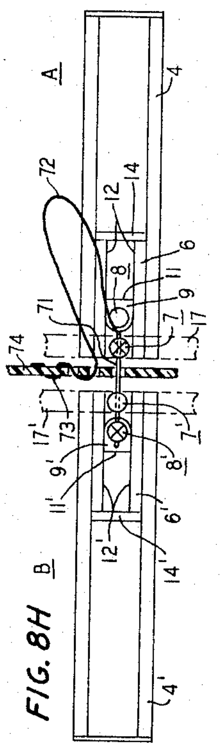

In accordance with the invention, rod 13 reverses direction and begins to return outer slide 11 and attached outer head 8 back toward core board 3. The compression of spring 78 simultaneously impels inner slide 6 and attached inner head 7 along at the same rate. After a brief delay to allow a little slack to develop in wire 72, a rotation is imparted to column 32 by stepping motor 46. Needle 71, lodged between notch 34 and surface 31, also rotates. The direction of rotation, advantageously, is chosen to move the forward portion of needle 71 away from the core just threaded and toward the core next to be threaded, as illustrated in FIGS. 8E through 8H. If a row of vertical cores are to be threaded, the direction of rotation is immaterial. Continued rotation pivots needle 71 in a horizontal plane through the chamber 20 shown in FIG. 4 which may be made sufficiently oblong to accommodate any desired length of needle. A loop 80 is thus formed in wire 72 and is supported freely by chamber 20. While needle 71 is being rotated 180 degrees, as shown in FIG. 8G, core board holder 3 is repositioned as desired by the control unit (not shown) through appropriate stepping of the horizontal drive motor 67 and/or of the vertical drive motor 69, shown in FIG. 3. A new core 79 to be threaded is thereby placed into the line of travel of needle 71. Front slide 6 returns to its original advanced position as shown in FIG. 6 and again in FIG. 8H, thereby inserting needle 71 through new core 79 and into the waiting inner head 7' ad outer head 8'. Rear slide 11 and outer head 8 continue until the latter is once again immediately adjacent inner head 7. Spring 78 compresses as the heads converge to maintain inner head 7 in its advance position until drawn into retreat during the next cycle. When outer head 8' grasps needle 71 and retreats to begin the next cycle of operation, the loop 80 in wire 72 is drawn through chamber 20 and ultimately disappears. The entire cycle of operation is now repeated by the mechanisms on the A side of plate 1, exactly in accordance with the steps described above.

The movements of the headsets and jaws are repetitive and, of course, may be directed by a suitable programmed sequential control unit. Similarly, successive cores may be inserted in the needle's path by a programmed positioning of the board holder.

It should be evident that the inventive principles herein illustrated are equally applicable to any wiring, sewing, lacing or other interconnecting processes which involve passing a needle, wire, thread or other strand back and forth through holes, fibers, or in fact, any compliant material. Moreover, persons skilled in the art may make numerous changes in the embodiment described without departing from the spirit and the scope of the invention as defined in the claims to follow.

What is claimed is:

1. Apparatus for passing a strand alternately back and forth through a freely positionable compliant element comprising, in combination, a pair of opposed headsets, each set being guidably mounted on an opposite side of said element for movement toward and away therefrom, each said headset comprising retractable and separately controlled inner and outer jaw means, each said inner jaw means being also rotatable, and means for alternately withdrawing and advancing each said headset with respect to said element, said strand being held in said inner and outer jaw means of a respective headset during withdrawal, said strand being released first by the respective outer jaw means, thereafter said strand end being rotated in said inner jaw during advance thereby forming a loop in said strand and pointing said end toward said element, said end advancing through said element and into said inner and outer jaws of the opposed headset.

2. Apparatus in accordance with claim 1 further comprising means for positioning each said outer jaw with respect to the adjacent inner jaw whereby each said inner jaw grasps said strand end only after the respective outer jaw has withdrawn with said wire a selected distance.

3. Apparatus in accordance with claim 2 wherein each said inner jaw further comprises a retractable upper portion and a rotatable lower portion, each said lower portion having a contact surface with a notch for receiving said strand to aid in said rotation.

4. Apparatus for threading a bendable strand back and forth through a compliant element comprising, in combination, means for freely positioning said element with respect to a fixed straight line intersecting said element, first and second headsets, each said set being guidably mounted for linear movement along said straight line on a respective side of said element between a remote position and an advanced position, said headsets comprising, respectively, first inner and outer heads and second inner and outer heads, all said heads being situated on said straight line and each said outer head being linearly positionable with respect to the adjacent inner head, means including said first inner head for directing a first end of said strand through said compliant element and into said advanced position of said second headset, means including said second outer head responsive to arrival of said first strand end at said last-named position for grasping a forward portion of said strand and for directing said second outer head toward said remote position of said second set, said second inner head remaining stationary, means including said second inner head responsive to movement of said second outer head a predetermined distance away from said second inner head for grasping a middle portion of said strand and concurrently for moving both said heads evenly toward said remote position, means including said second outer head responsive to arrival of said second set at said remote position for releasing said forward portion of said strand, means including said second inner head responsive to said last-named release for rotating said strand forward portion 180 degrees, thereby pointing said forward portion back toward said element and imparting a loop to said strand behind said midportion thereof, and means responsive to said rotation for returning said second headset toward its said advanced position, whereby said strand is directed through a new portion of said element.

5. Apparatus for threading a needle and strand back and forth through an array of parallel apertures in opposite surfaces of an element comprising, in combination, means for positioning said element in a selected plane to align successive ones of said apertures with respect to a selected line perpendicular to said plane, first and second headsets, each said set being guidably mounted for linear movement along said line on an opposite side of said plane between, respectively, a remote and advanced position, said headsets comprising, respectively, first inner and outer heads and second inner and outer heads, all of said heads being situated on said selected line and each said outer head being linearly positionable with respect to the adjacent inner head, means including said first inner head for directing said needle through a first aperture and to said advanced position of said second set, means including said second outer head responsive to arrival of said needle at said last-named position for grasping a forward portion of said needle and for moving said second outer head toward said remote position of said second set, said second inner head remaining stationary, means including said second inner head responsive to said movement of said second outer head a predetermined distance for grasping a rearward portion of said needle and concurrently for moving both said heads uniformly toward said remote position, said strand being drawn by said needle through said first aperture, means including said second outer head responsive to arrival of said second set at its said remote position for releasing said needle forward portion and for returning said second inner and outer heads to said advanced position, means including said second inner head responsive to the initial return movement of said last-named heads for rotating said needle 180 degrees, thereby imparting a loop to said strand behind said needle, means responsive to return of said second set to its said advanced position for stopping said second inner head, said second outer head advancing said predetermined distance and then stopping, whereby said needle and strand are directed through a second aperture in said element and into said advanced position of said first headset.

6. Apparatus in accordance with claim 5 wherein each said inner head further comprises rotatable jaw means for releasably holding said needle and for looping said wire, and each said outer head further comprises fixed jaw means for releasably holding said needle, all said jaw means being positioned on said selected line.

7. Apparatus in accordance with claim 6 wherein said rotatable jaw means of each said inner head further comprises rotatable upper and lower portions, said upper portion being retractable toward and away from said lower portion and having a surface for contacting said strand, said lower portion having a contacting surface with a V-shaped notch therein for receiving and guiding said needle, said lower portion being responsive to said rotation for urging said needle against said contacting surface and said notch thereby to turn said wire and produce said loop therein.

8. Apparatus in accordance with claim 7 wherein each said inner head further comprises elongated upper and lower yokes, said yokes being fastened at opposed end portions thereof in spaced-apart relation thereby defining a narrow, unobstructed chamber, means for mounting said upper portion of said inner head midway between said ends of said upper yoke, said upper portion contact surface withdrawably protruding through said upper yoke and into said chamber, and means for mounting said lower portion of said inner head midway between said ends of said lower yoke, said V-shaped notch protruding into said chamber in opposed relation to said contact surface, whereby on rotation of said lower portion said needle rotates within said chamber and said wire loop thereby formed is supported therein.

9. In a core board wiring machine, in combination, means for positioning a core board within a plane to align specific cores therein with respect to a selected line perpendicular to said plane, a first headset comprising a first inner head and a first outer head each guidably mounted on a first side of said plane for linear movement along said selected line, a second headset comprising a second inner head and a second outer head each guidably mounted on the opposite side of said plane for linear movement along said selected line, each said inner head comprising rotatable jaw means for releasably holding and looping a wire and each said outer head comprising fixed jaw means for releasably holding said wire, all of said jaw means being situated along said selected line, and said wire being grasped initially in said fixed jaw means of said first inner head with an end of said wire directed toward a prepositioned core in said plane, means for linearly positioning each said inner head a preselected distance toward and away from the adjacent outer head, means for moving said first inner and outer heads along said selected line between a first remote station and a first advanced station on said first side of said plane and means for moving said second inner and outer heads along said selected line between a second remote station and a second advanced station on said opposite side of said plane, means responsive to movement of said first headset to said first advanced position for directing said wire end through said prepositioned core and into said rotatable and fixed jaw means of said second headset, said fixed jaw means closing to grasp said wire end, means responsive to the closing of said fixed jaw means for moving said second outer head toward said second remote position, means responsive to movement of said outer head said preselected distance away from said inner head for closing said rotatable jaw means around a portion of said wire end and concurrently for moving both said heads evenly toward said second remote station, means responsive to arrival of said second headset at said second remote station for opening said fixed jaw means, means responsive to the opening of said fixed jaw means for starting said second inner and outer heads back toward said advanced position and thereafter rotating said rotatable jaw means 180 degrees, thereby to form a loop in said wire, said inner head stopping at said second advanced station and said outer head advancing a further amount equal to said preselected distance and then stopping whereby said second headset directs said wire end through a different prepositioned core.

10. Apparatus in accordance with claim 9 wherein each said rotatable jaw means further comprises an upper portion, said upper portion having a wire contacting surface and being retractably mounted for perpendicular movement with respect to said selected line, and a lower portion rotatably mounted on an axis coincident with the line of retraction of said upper portion, said lower portion further comprising a wire contacting surface having therein a notch for receiving and guiding said wire, said notch being axially coincident with said selected line, said wire being grasped between said notch and said upper portion contacting surface, said lower portion being responsive to said rotation for turning said wire, thereby to direct said wire end toward said core board and to produce a loop in said wire.

11. Apparatus in accordance with claim 10 wherein each said inner head further comprises elongated upper and lower yokes, said yokes being fastened at adjacent end portions thereof in opposed parallel spaced-apart relation at right angles to said selected line and to said line of retraction of said upper portion, said yokes thereby defining a narrow, unobstructed chamber between them, means for mounting said upper portion of said inner head midway between said ends of said upper yoke, said upper portion contacting surface withdrawably protruding through said upper yoke and into said chamber, and means for mounting said lower portion of said inner head midway between said ends of said lower yoke, said notch protruding into said chamber in opposed relation to said upper portion contacting surface, whereby when said last-named surface and said notch are grasping said wire and said lower portion is rotated, said wire end pivots through said chamber, and said wire loop thereby formed is supported in said chamber.

12. Apparatus in accordance with claim 11 wherein said first wire end comprises a needle, said needle being substantially longer than the maximum distance between an inner head and the adjacent outer head, and wherein said notch in each said inner head lower portion comprises a V-shaped groove and each said upper portion of each said inner jaw is rotatably mounted around said line of retraction, said needle being held for translational and rotational movement between said upper portion contacting surface and opposite sides of said V-shaped groove.

13. Apparatus for threading a wire back and forth through orifices in a board, comprising:

means for positioning said board in an X–Y plane, with a pre-determined plan for sequenially locating selected said orifices around a single fixed linear path intersecting said plane;

a pair of opposed heads each comprising means for grasping a strand-carrying needle;

means for guidably mounting each head on opposite sides of said plane along said single linear path;

means for moving each head independently toward and away from said plane, each head reeciving said needle after its being passed through an orifice by the other head, and each head thereafter retreating away from the board;

means including said retreating head for drawing the strand through said board;

means responsive to the completed drawing of said strand through said board for advancing the strand-handling head toward said board, thereby forming a slack loop in said strand; and means for rotating said strand-handling head 180° after formation of a slack loop sufficient to allow such rotation without severing the strand.

References Cited

UNITED STATES PATENTS

| | | | |
|---|---|---|---|
| 2,648,303 | 8/1953 | Gerber | 112—170 |
| 3,122,178 | 2/1964 | Marine et al. | 140—93 |
| 3,129,679 | 4/1964 | Gerth et al. | 140—93 |
| 3,238,903 | 3/1966 | Pav | 112—170 |

CHARLES W. LANHAM, *Primary Examiner.*

L. A. LARSON, *Assistant Examiner.*